United States Patent
Bolt et al.

[11] Patent Number: 5,557,923
[45] Date of Patent: Sep. 24, 1996

[54] METHOD AND DEVICE FOR REMOVING PARTICLES FROM EXHAUST GASES FROM INTERNAL COMBUSTION ENGINES

[75] Inventors: Heinz Bolt, Wolfratshausen; Franz Walser, Murnau; Axel Schoneborn, Rodenbach, all of Germany

[73] Assignees: Linde Aktiengesellschaft; GST Systeme, Gesellschaft Fur Abscheide-Und Steuertechnik mbH, Germany

[21] Appl. No.: 367,357
[22] PCT Filed: Jul. 14, 1993
[86] PCT No.: PCT/EP93/01851
§ 371 Date: Mar. 9, 1995
§ 102(e) Date: Mar. 9, 1995
[87] PCT Pub. No.: WO94/02719
PCT Pub. Date: Feb. 3, 1994

[30] Foreign Application Priority Data
Jul. 15, 1992 [DE] Germany .......... 42 23 277.5

[51] Int. Cl.⁶ .................................................. F01N 3/18
[52] U.S. Cl. .................. 60/274; 55/466; 55/DIG. 30; 60/275; 60/311; 95/68; 95/70; 96/55
[58] Field of Search ............. 60/274, 275, 311; 55/466, DIG. 30; 95/68, 70; 96/55

[56] References Cited

U.S. PATENT DOCUMENTS

| | | | |
|---|---|---|---|
| 4,791,785 | 12/1988 | Hudson et al. | 60/303 |
| 4,871,515 | 10/1989 | Reichle | 60/275 |
| 5,425,236 | 6/1995 | Haerle | 60/299 |
| 5,440,876 | 8/1995 | Bayliss | 60/275 |

FOREIGN PATENT DOCUMENTS 0425433  4/1982  European Pat. Off. .

OTHER PUBLICATIONS

"Rußfiltertechnik für Stadtlinienbusse", Internationales Verkehrswesen [Soot Filter Technology for Municipal Buses, International Transportation] 40 (1988), vol. 1, Jan./Feb., pp. 46–51, (No Translation).

*Primary Examiner*—Douglas Hart
*Attorney, Agent, or Firm*—Webb Ziesenheim Bruening Logsdon, Orkin & Hanson, P.C.

[57] ABSTRACT

The invention concerns a method and device for removing particles, in particular soot particles, from exhaust gases produced by internal-combustion engines. The invention calls for the particles to be electrostatically charged by an electrode (4). The particles or particle agglomerates are trapped by a fine-mesh metal filter (5). The conducting material (5a), preferably a sintered ferritic metal, of which the filter (5) is made can also be used as a collecting electrode. A high voltage (6) is applied (7, 10) to the electrodes. At intervals, preferably at regular intervals, an electric current is passed (11, 12) through the filter (5), causing the filter material (5a) to heat up to a temperature above the ignition temperature of the particles. The preferred shape of the filter surface is a cylinder, truncated cone and/or cone.

20 Claims, 1 Drawing Sheet

5,557,923

METHOD AND DEVICE FOR REMOVING PARTICLES FROM EXHAUST GASES FROM INTERNAL COMBUSTION ENGINES

BACKGROUND OF THE INVENTION

1. Field of the Invention

This invention relates to a method and a device for the removal of particles, in particular particles of soot, from the exhaust of internal combustion engines, whereby the particles are electrostatically charged by means of at least one electrode, some of the particles form agglomerates, and the particles and/or particle agglomerates are separated by means of one or more filters, as well as a device for the removal of particles, in particular soot particles, from the exhaust of internal combustion engines, whereby the device comprises a housing with a feed line and a discharge line for the exhaust, at least one electrode which is connected to a high voltage source for the electrostatic charging of the particles, and a filter body.

2. Description of the Prior Art

The reduction of particulate emissions in exhaust gases plays a major role in efforts to further reduce pollution caused by exhaust gases from internal combustion engines, in particular from Diesel engines. Numerous attempts have therefore been made to remove the particulate emissions, in particular particles of soot, which are contained in exhaust gases.

A survey of the prior art has identified the publication "Rulβfiltertechnik für Stadtlinienbusse", Internationales Verkehrswesen ["Soot Filter Technology for Municipal Buses", International Transportation], 40 (1988), Volume 1, January/February. Ceramic monolith filters, filter candles with a filter means made of ceramic or wire mesh or filters wound with ceramic yarn or a combination of an electric coagulator and a downstream cyclone are used to remove particulates.

In the last-named system for the removal of particles, an agglomeration of the particles takes place in the electric coagulator, so that the particles can then be removed in the downstream cyclone, taking advantage of the centrifugal force on the particles in the receiving chamber of the cyclone, while the gas current is emitted through the submerged tube of the cyclone as clean gas into the exhaust. In this particle-removal system, however, it is necessary to make separate arrangements for the disposal of the particles removed.

When filters are used, a regeneration or replacement of the filter is necessary, since the particles which have been removed clog the filter, and the pressure loss caused by the filter increases as the filter charge increases. The regeneration is performed by burning away the particles at temperatures which are above the ignition temperature of the soot. Since this temperature is not reached in exhaust gases from internal combustion engines, or is reached only during full load operation, either the exhaust gas temperatures must be increased by motor-driven measures, or the ignition temperature of the exhaust must be reduced by additives added independently to the fuel, to the intake air or to the exhaust, or by catalytic coatings on the filter. An additional possibility is a forced regeneration by the application of heat, e.g. by means of burners.

Metal filters, such as filters made of wire mesh, have the disadvantage of a reduced high-temperature strength, which is insufficient for the removal of particulates from the above-mentioned exhaust gases. In particular, filters made of such material are unsuitable for a thermal regeneration.

U.S. Pat. No. 4,406,119 discloses a method for the removal of particles from the exhaust flow of internal combustion engines, whereby the particles are negatively charged by means of an electrode with a high voltage of 10–20 kV, some of the particles form agglomerates and are separated by means of a filter and a downstream cyclone or heating element. The filters consist of porous ceramic or metal meshes or tissues.

EP-A-0 425 433 discloses a process in which charged soot particles are filtered out in at least one filter with opposite polarity. The filter material consists of an open-pore network structure made of fibers or a base structure which has high temperature resistance, whereby the network structure is designed in the form of foam, porous sinter, fiber tissues, braided fibers, non-woven tissue or loose bundles of fibers, and consists of electrically conducting fibers, fibers provided with an electrically conducting coating, or of such a basic structure. Electrically conducting fibers or basic structures of the filter materials can consist of metals, e.g. stainless steel.

JP-A-59 145 314 discloses an apparatus with a high voltage electrode for the generation of an electrostatic field and a collector made of foamed steel as a counter electrode to trap the electrically charged particles.

EP-A-0 244 061 discloses a method for the regeneration of a filter loaded with combustible particles of a Diesel engine exhaust, whereby an electrical current is conducted through the loaded filter, and the filter is thereby heated above the ignition temperature of the particles. Several filters are operated-simultaneously in the exhaust flow. During the regeneration, the exhaust gas does not flow through the filters.

The object of the invention is therefore to create a method and a device of the type indicated above which make it possible in a simple manner to effectively remove particulates from the exhaust gases of internal combustion engines, in particular of land vehicles or water craft operated with internal combustion engines, without thereby adversely affecting the mobility of the vehicles. During the removal of the particles, it should be possible to regenerate the filters during the operation of the internal combustion engine.

SUMMARY OF THE INVENTION

The invention teaches that this object can be achieved by a method in which the exhaust gas flows through a sintered metal fine-mesh filter with at least one precipitation electrode even during the regeneration, and that for the regeneration, an electrical current is conducted through the loaded fine-mesh filter, and the fine-mesh filter is thereby heated above the ignition temperature of the particles.

The method according to the invention takes advantage of the high trapping capacity of fine-mesh filters. The agglomeration also significantly facilitates the separation process. The method can thereby be used over the entire range of particles present in the exhaust gas, such as soot from Diesel engines, but also to remove droplets. The above-mentioned filter system is thereby not installed in a bypass flow, but in the main flow of the exhaust gas. Theoretically, several fine-mesh filters, with different degrees of separation, can be installed in cascade fashion. But preferably only one fine-mesh filter is used. A counter electrode as the precipitation electrode is located in the fine-mesh filter or fine-mesh filters. In addition to the purely mechanical separation in the filter, there is also an electrostatic separation of the charged particles.

If the temperature of the exhaust gas in the vicinity of the fine-mesh filter is higher than the ignition temperature of the particles, the particles are burned off, and there is thus a regeneration of the fine-mesh filter. The invention teaches that an electrical current is periodically conducted through the fine-mesh filter for the regeneration of the loaded fine-mesh filter. Employing the principle of resistance heating, the filter material thereby becomes hot and incandescent. The result is a regulated heating of the fine-mesh filter above the ignition temperature of the particles (approximately between 450 and 600 degrees C.), which results in the burning of the particles and the regeneration of the fine-mesh filter.

The filter material of the fine-mesh filter itself can be advantageously used as the precipitation electrode. Thus there is no need for the installation of a counter electrode in the fine-mesh filter. The trapping capacity of the filter can be increased further.

A ferritic sintered metal is preferably used as the filter material. This material has an extraordinarily high static and dynamic mechanical stability. It can be used up to very high temperatures, e.g. up to 900 degrees C. But the ferritic sintered metals are also characterized by high strength in the presence of temperature changes. The ferritic sintered metals used are also chemically stable, e.g. against alternating oxidizing and reducing atmospheres, such as those which are likely to be encountered during operation of the filter and during the regeneration process.

The method claimed by the invention preferably has a high voltage between 2 and 15 kV applied between the electrodes or between the electrode and the filter material.

The preferred electrical current is less than 300 A, with an electrical power between 20 and 140 W, and is conducted through the fine-mesh filter for a period of less than 20 seconds. By observing the values indicated above, it is possible to conduct a controlled regeneration on vehicles which have an on-board power supply. Moreover, the removal of the particulates is guaranteed during the regeneration process. The controlled regeneration of the invention results in extraordinary advantages, with a flexibility and independence specifically for vehicles with internal combustion engines, because the regeneration time can be selected as a function of the degree of loading of the fine-mesh filter, and since in the method of the invention, no additional additives are required to reduce the ignition temperatures, the periods during which the filter is out of operation for regeneration can be completely eliminated. The electrical current can be supplied periodically with particular advantage. It is possible, however, to also supply the current as a function of the degree of loading of the fine-mesh filter which, for example, can be controlled by means of a measurement of the drop in the pressure of the exhaust gas.

The object of the invention can be accomplished by means of a device as disclosed, in which the filter body acting as the counter electrode is integrated in a sealed manner into the housing, has at least one sintered metal filter surface, and the filter surface is connected by means of electrical lines to a current source.

The exhaust gas flow introduced into the housing via the input line is first transported past at least one electrode, within causes an electrostatic charging of the particles in the exhaust gas flow. The shape of the electrode can be selected to meet the requirements of the application in question. Preference is given, however, to the use of disc-shaped or ring-shaped electrodes. Several electrodes can be used. There is a counter electrode in the filter body. Preferably, only one electrode with a counter electrode is used. The filter body is integrated in a sealed manner into the housing, so that the entire exhaust flow is forced to flow through the sintered metal filter surface. The sintered metal filter surface is connected in a conductive manner to the power source by means of the housing or by means of an electrical line.

In the device according the invention, the filter surface is connected to a power source by means of electrical lines. As described above, an electrical current is conducted intermittently, i.e. discontinuously, through the filter surface, and on account of the specific electrical resistance of the sintered metal filter material used, the filter surface glows incandescent and heats the soot particles above the ignition temperature, thereby burning off the particles.

Advantageously filter surface can consist of ferritic sintered metal. The filter surface is preferably constructed of a nonwoven filter fabric. The geometric shape of the filter surface can correspond to filter shapes of the prior art. The filter surface is preferably in the shape of a cylinder, a truncated cone or a cone, or represents a combination of one or more filter surfaces in the shape of a cylinder, truncated cone or cone.

BRIEF DESCRIPTION OF THE DRAWINGS

The invention is explained in greater detail below, with reference to two embodiments illustrated in the accompanying figures, wherein.

Items which are identical or equivalent in FIGS. 1 and 2 are identified by the same reference numbers. In the accompanying figures, the direction of the exhaust gas flow is indicated by arrows.

DETAILED DESCRIPTION OF EMBODIMENTS OF THE INVENTION

Figure 1:
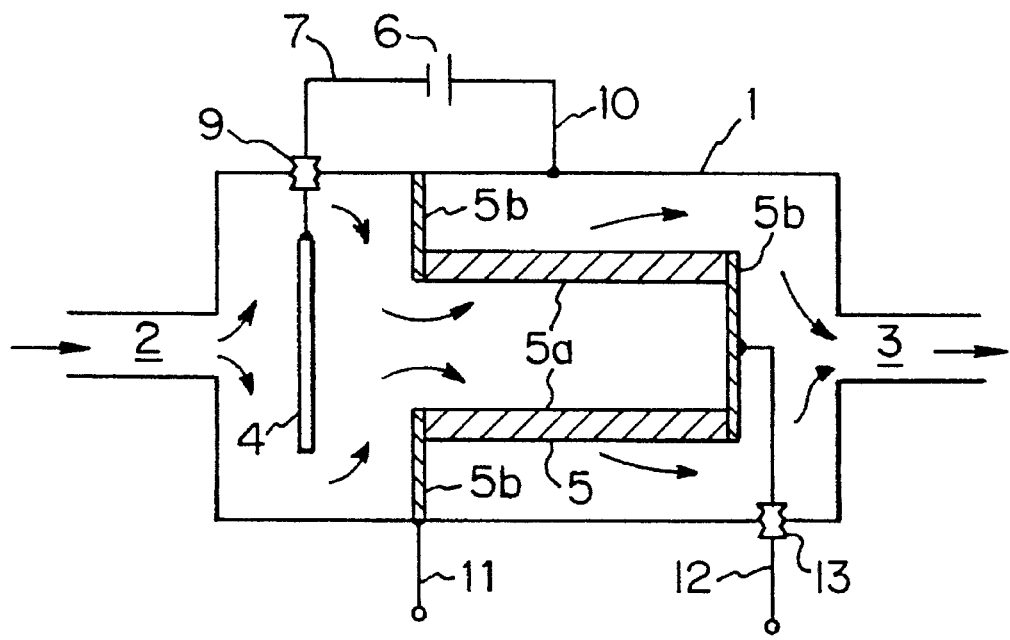
FIG. 1 is a cross-sectional view of a device according to by the invention with a cylindrical filter surface.

In the device illustrated in FIG. 1, the exhaust gas containing the particles to be removed is conducted via line 2 into the housing 1 of a particle separator according to the invention. Inside the housing, the exhaust gas is transported past the disc-shaped emission electrode 4. The electrode 4 is connected to a high voltage source 6 by means of electrical line 7. The high-voltage line 7 is electrically insulated from the housing by means of an insulator 9. The exhaust gas flow with the charged particles, or the particle agglomerates which are formed, travels from the electrode 4 to a filter body 5, which includes a cylindrical filter surface 5a and a filter holder 5b. The particle separation takes place on the filter surface 5a, so that a particle-free exhaust gas leaves the particle separator via line 3.

The particle separation on the filter surface 5a takes place both mechanically and electrostatically. The filter surface 5a, which is made of ferritic sintered metal and is itself electrically conducting, thereby acts as a precipitation electrode. There is an electrically conducting connection to the high voltage source 6 via the filter holder 5b, which is also electrically conducting, to the housing 1, and from there via the electrical line 10 to the voltage source 6. The electrically conducting connection to the power source required for regeneration is guaranteed by means of the electrical lines 11 and 12, whereby line 12 passes through the housing 1 and is electrically insulated from the housing 1 by insulator 13.

Figure 2:
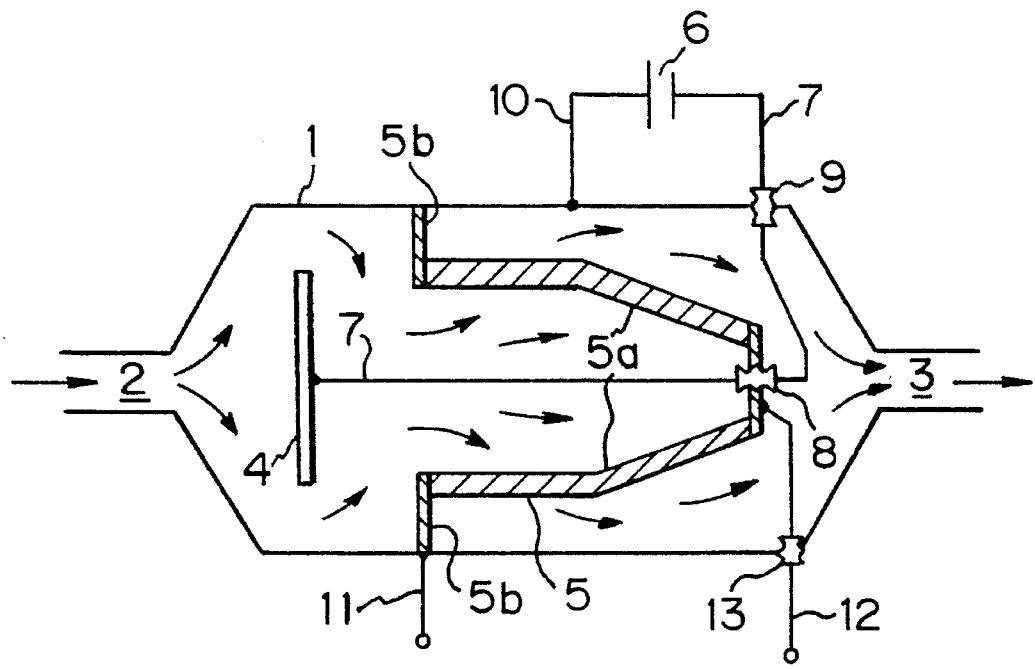
FIG. 2 is a cross-sectional view of a device according to by the invention with a filter surface composed of parts in the shape of a cylinder and a truncated cone.

In contrast to FIG. 1, FIG. 2 does not show a cylindrical filter surface 5*a*, but a filter surface 5*a* which is composed of parts in the shape of a cylinder and a truncated cone. Also in FIG. 2, the electrical connecting line 7 from the electrode 4 to the high voltage source 6 is first guided centrally through the filter body 5 and then through the housing 1. This special routing of the high voltage line 7 prevents a deposition of particles on the line 7, and any resulting flashover between the electrode 4 and the housing 1, to which a different electrical potential is applied. The necessary electrical insulation with respect to the filter body 5 and the housing 1 is accomplished by means of insulators 8 and 9. Furthermore, in contrast to FIG. 1, in the particle separator illustrated in FIG. 2, the housing is beveled toward input line 2 and output line 3, thereby resulting in an improved flow through the separator.

Having described certain embodiments of the invention, it is to be understood that this may be otherwise embodied within the scope of the appended claims.

We claim:

1. A method for the removal of particles from the exhaust gases produced by internal combustion engines by electrostatically charging the particles by at least one electrode, causing some of the particles to form agglomerates and trapping the particles and particle agglomerates by at least one filter, said method comprising the steps of:
    a. continuously passing the exhaust gases through a sintered metal fine-mesh filter having at least one precipitation electrode even during regeneration of the filter; and
    b. conducting an electrical current periodically through the sintered metal fine-mesh filter to regenerate the filter and heat the filter above the ignition temperature of the particles.

2. The method as claimed in claim 1 wherein the filter material of the fine-mesh filter itself acts as the precipitation electrode.

3. The method as claimed in claim 1 wherein the fine-mesh filter is formed from a ferritic sintered metal.

4. The method as claimed in claim 2 wherein the fine-mesh filter is formed from a ferritic sintered material.

5. The method as claimed in claim 1 further including the step of applying a high voltage between the electrodes.

6. The method as claimed in claim 1 wherein said high voltage is between about 2 and 15 kV.

7. The method as claimed in claim 2, further including the step of applying a high voltage between the electrodes.

8. The method as claimed in claim 7 wherein said high voltage is between about 2 and 15 kV.

9. The method as claimed in claim 4, further including the step of applying a high voltage between the electrodes.

10. The method as claimed in claim 1 wherein an electrical current of less than 300 A with an electrical power between about 200 and 140 W passes through the fine-mesh filter for a period of less than about 20 seconds.

11. The method as claimed in claim 10 wherein the electrical current passes through the filter periodically.

12. A device for the removal of particles from the exhaust from internal combustion engines, comprising:
    a housing with an input line and a discharge line for the exhaust;
    at least one electrode connected to a voltage source and a filter body;
    said filter body being integrated in a sealed manner into the housing, adapted to act as a counter electrode, and having at least one sintered metal surface; the metal surface being connected by means of electrical lines to a current source.

13. The device as claimed in claim 12 wherein the sintered metal filter surface is connected in a conductive manner to the voltage source.

14. The device as claimed in claim 12 wherein the filter surface is formed of ferritic sintered metal.

15. The device as claimed in claim 13 wherein the filter surface is formed of ferritic sintered metal.

16. The device as claimed in claim 12 wherein the filter surface is formed of nonwoven filter fabric.

17. The device as claimed in claim 13 wherein the filter surface is formed of nonwoven filter fabric.

18. The device as claimed in claim 12 wherein the filter surface is designed in the shape of a cylinder.

19. The device as claimed in claim 12 wherein the filter surface is designed in the shape of a truncated cone.

20. The device as claimed in claim 12 wherein the filter surface is designed in the shape of a cone.

* * * * *

UNITED STATES PATENT AND TRADEMARK OFFICE
CERTIFICATE OF CORRECTION

PATENT NO. : 5,557,923
DATED : September 24, 1996
INVENTOR(S) : Heinz Bolt, Franz Walser and Axel Schoneborn It is certified that error appears in the above-indentified patent and that said Letters Patent is hereby corrected as shown below:

Column 1 Line 31 "Rulßfiltertechnik" should read --Rußfiltertechnik--.

Column 2 Line 33 "operated-simultaneously" should read --operated simultaneously--.

Column 3 Line 65 "within" should read --which--.

Column 4 Line 19 after "Advantageously" insert --, the--.

Column 4 Line 34 delete "by".

Column 4 Line 36 delete "by".

Column 5 Line 2 before "regeneration" insert --the--.

Column 5 Line 2 before "electrical" delete "the".

Signed and Sealed this

Fourteenth Day of January, 1997

Attest:

BRUCE LEHMAN

Attesting Officer

Commissioner of Patents and Trademarks